United States Patent
Beery et al.

(10) Patent No.: US 12,192,381 B2
(45) Date of Patent: Jan. 7, 2025

(54) SYSTEM AND METHOD FOR SECURE MULTI-PARTY COMPUTATION BASED BLOCKCHAIN TRANSACTION

(71) Applicant: KZEN NETWORKS LTD, Tel Aviv (IL)

(72) Inventors: Tal Arieh Beery, Petach Tikva (IL); Ouriel Ohayon, Tel Aviv (IL); Omer Shlomovits, Petach Tikva (IL); Gary Benattar, Netanya (IL)

(73) Assignee: ZENGO LTD, Tel Aviv (IL)

( * ) Notice: Subject to any disclaimer, the term of this patent is extended or adjusted under 35 U.S.C. 154(b) by 830 days.

(21) Appl. No.: 17/274,915

(22) PCT Filed: Sep. 9, 2019

(86) PCT No.: PCT/IL2019/051005
§ 371 (c)(1),
(2) Date: Mar. 10, 2021

(87) PCT Pub. No.: WO2020/053851
PCT Pub. Date: Mar. 19, 2020

(65) Prior Publication Data
US 2022/0045867 A1  Feb. 10, 2022

Related U.S. Application Data

(60) Provisional application No. 62/729,918, filed on Sep. 11, 2018.

(51) Int. Cl.
*H04L 9/32* (2006.01)
*H04L 9/08* (2006.01)
*H04L 9/00* (2022.01)

(52) U.S. Cl.
CPC .......... *H04L 9/3252* (2013.01); *H04L 9/085* (2013.01); *H04L 9/0861* (2013.01);
(Continued)

(58) Field of Classification Search
CPC ..... H04L 9/3252; H04L 9/085; H04L 9/0861; H04L 9/0891; H04L 9/50; H04L 2209/46
See application file for complete search history.

(56) References Cited

U.S. PATENT DOCUMENTS 10,068,228 B1 * 9/2018 Winklevoss ........... G06Q 20/34
2016/0269186 A1    9/2016 Wallrabenstein
(Continued)

FOREIGN PATENT DOCUMENTS

WO  WO 2017/145010       8/2017
WO  WO-2017145010 A1 *   8/2017  ............. G06Q 20/36

OTHER PUBLICATIONS

Goldfeder et al, "Securing Bitcoin wallets via a new DSA/ECDSA threshold signature scheme" Jun. 30, 2015 (Year: 2015).*
(Continued)

*Primary Examiner* — Syed A Zaidi
(74) *Attorney, Agent, or Firm* — PEARL COHEN ZEDEK LATZER BARATZ LLP

(57) ABSTRACT

System and method of creating a multi-party computation (MPC) cryptographic signature for a blockchain based computer network, including: generating at least one first share and second share of a cryptographic key, based on a distributed key generation MPC protocol, signing a received message with the at least one first share, receiving the message signed with the at least one first share, signing the message signed with the at least one first share with the at least one second share, sending the message signed with the at least one second share and the at least one first share to a full node of the computer network, and adding a transaction to a ledger of the computer network, in accordance with the received message signed by the at least one first share and the at least one second share.

18 Claims, 5 Drawing Sheets

(52) U.S. Cl.
CPC .............. *H04L 9/0891* (2013.01); *H04L 9/50* (2022.05); *H04L 2209/46* (2013.01)

(56) References Cited

U.S. PATENT DOCUMENTS

| | | | | |
|---|---|---|---|---|
| 2017/0142082 | A1* | 5/2017 | Qian | G06F 21/62 |
| 2019/0222414 | A1* | 7/2019 | Pe'er | H04L 9/088 |
| 2020/0082113 | A1* | 3/2020 | Van Liesdonk | G06Q 10/087 |
| 2020/0084049 | A1* | 3/2020 | Lindell | H04L 9/085 |
| 2021/0067315 | A1* | 3/2021 | Mitchell | H04L 9/0866 |
| 2023/0028854 | A1* | 1/2023 | Be'ery | H04L 9/085 |

OTHER PUBLICATIONS

NPL Search Terms (Year: 2024).*

R. Gennaro, S. Goldfeder, and A. Narayanan, Threshold-optimal DSA/ECDSA signatures and an application to Bitcoin wallet security: ACNS 2016, International Conference on Applied Cryptography and Network Security, Jul. 2016.

Y. Lindell, "Fast Secure Two-Party ECDSA Signing", Advances in Cryptology—Crypto 2017,. Lecture Notes in Computer Science, vol. 10402, pp. 613-644 (Jul. 2017).

D. Boneh, R. Gennaro, and S. Goldfeder, "Using Level-1 Homomorphic Encryption to Improve Threshold DSA Signatures for Bitcoin Wallet Security", Progress in Cryptology—Latincrypt 2017, pp. 352-377.

P. Paillier, and D. Pointcheval, "Efficient Public-Key Cryptosystems Provably Secure Against Active Adversaries", Advances in Cryptology—Asiacrypt. Springer. pp. 165-179, 1999.

C. Hazay, G. L. Mikkelsen, T. Rabin, T. "Toft. Efficient RSA key generation and threshold paillier in the two-party setting", in Topics in Cryptology—CT-RSA 2012, Lecture Notes in Computer Science, vol. 7178. Springer, Berlin, Heidelberg, pp. 313-331 (2012).

I. Damgard and M. Jurik, "A generalisation, a simplification and some applications of Paillier's probabilistic public-key system", Public Key Cryptography, PKC 2001. Lecture Notes in Computer Science, vol. 1992, pp. 119-136, Springer, Berlin, Heidelberg (Jun. 2001).

Dan Boneh, Manu Drijvers and Gregory Neven, "Compact Multi-Signatures for Smaller Blockchains", Advances in Cryptology—Asiacrypt 2018, pp. 435-464.

Y. Lindell, "How to simulate it—a tutorial on the simulation proof technique", Tutorials on the Foundations of Cryptography, Springer International Publishing AG, Cham, Switzerland, Jul. 2018.

A. Herzberg, M. Jakobsson, S. Jarecki, H. Krawczyk, and M. Yung, "Proactive public-key and signature systems", in Proceedings of the Fourth Annual Conference on Computer Communications Security, pp. 100-110, ACM, Jan. 1997.

P. Dikshit at al., "Efficient weighted threshold ECDSA for securing bitcoin wallet," *2017 ISEA Asia Security and Privacy (ISEASP)*, Jan. 29, 2017, pp. 1-9.

Search Report for European Application No. 19859850.0, mailed on May 6, 2022.

C. Stathakopoulou, C. Cachin "Threshold Signatures for Blockchain Systems" Swiss Federal Institute of Technology, Zurich. IBM Research—Zurich. Apr. 4, 2017.

Hongmei Deng "Threshold and Identity-based Key Management and Authentication for Wireless Ad Hoc Networks" OBR Center for Distributed and Mobile Computing, Department of ECECS University of Cincinnati, Cincinnati, OH. Apr. 5, 2004.

Fokin Dennis "A secure multi-party scheme with certificateless cryptography for secret key extraction" KTH Royal Institute of Technology School of Electrical Engineering and Computer Science, Stockholm, Sweden 2018.

Alexander Block "Secret Sharing and Threshold Signatures with BLS" Jul. 1, 2018—blog.dash.org.

Doerner J. et al. "Secure Two-Party Threshold ECDSA from EDCSA Assumptions." In 2018 IEEE Symposium on Security and Privacy (SP) (pp. 980-997) May 1, 2019.

Goldfeder S. et al. "Securing Bitcoin wallets via a new DSA/ECDSA threshold signature scheme." Jun. 30, 2015—stevengoldfeder.com/papers/threshold_sigs.pdf.

International Search Report for application No. PCT/IL2019/051005 dated Dec. 10, 2019.

* cited by examiner

SYSTEM AND METHOD FOR SECURE MULTI-PARTY COMPUTATION BASED BLOCKCHAIN TRANSACTION

CROSS-REFERENCE TO RELATED APPLICATIONS

This application is a National Phase Application of PCT International Application No. PCT/IL2019/051005, International Filing Date Sep. 9, 2019, claiming the benefit of U.S. Provisional Patent Application No. 62/729,918, filed Sep. 11, 2018 both of which are hereby incorporated by reference.

FIELD OF THE INVENTION

The present invention relates to blockchain based computer networks. More particularly, the present invention relates to systems and methods for secure multi-party computation based blockchain transactions.

BACKGROUND OF THE INVENTION

Currently, the security of all blockchain based cryptocurrency wallets typically solely depends on the security of its private key, used to digitally sign a user transaction and thereby prove its validity. Typically, most cryptocurrency wallets either store the key on a customer's device or on the wallet's service side. Therefore, typically when these devices are compromised a cyber-theft is possible.

In typical classic blockchain software implementations, a client locally generates a private key and a corresponding public key. The public key can be used to create an address and/or the messages to be signed can be transactions of value between such addresses (or accounts). Verification of transaction validity can be done publicly by the blockchain maintainers using the relevant addresses' public keys, while the key generation can be done locally using the client's secret key.

In order to achieve a distributed signing for blockchain algorithms, it may be required to change the key generation (generating a private-public keypair) and/or signing protocols without affecting the public verification protocol to validate a signature on a message using the public key.

Distributed key generation protocols may involve two main parts: a local secret data being generated (e.g., similar to an original centralized key generation protocol) by each of the parties, and communication between the participating parties to provide the necessary view to all other parties, to compute the composed public key (and resulting address), and also subsequently generate the signatures.

Distributed signing may occur only after the key generation and usually involves an interactive protocol for each party: receiving a message to sign, and applying local computation on the message using local data previously generated on the key generation protocol to distribute the results and compute signature locally. For example, in a multiparty Schnorr protocol each party computes a local signature using its local secret data and a special composed public key. Each party then sends the computed result to all other parties and the final signature is the sum of local ones.

Splitting of the signing functionality can be currently considered as best practice for security considerations and implemented in some of the blockchain networks such as 'Bitcoin', as the "multi-signature" extension, in which multiple signers are explicitly assigned with multiple distinct keys by a dedicated signature algorithm. In case that the "multi-signature" is desired for a new blockchain related feature, that might not be supported, and therefore needs to be re-implemented per each supported blockchain, requiring more code, work and inevitably more security vulnerabilities. Some additional disadvantages of the "multi-signature" feature may include increased size of transaction data (due to the additional signatures).

SUMMARY

There is thus provided, in accordance with some embodiments of the invention, a method of creating a multi-party computation (MPC) cryptographic signature for a blockchain based computer network, for signing a received message. Embodiments of the method may include: generating, by at least one first computing device, at least one first share of a cryptographic key, based on a distributed key generation MPC protocol, generating, by at least one second computing device, at least one second share of the cryptographic key, based on the distributed key generation MPC protocol, signing, by the at least one first computing device, the received message with the at least one first share, receiving, by the at least one second computing device, the message signed with the at least one first share, signing, by the at least one second computing device, the message signed with the at least one first share with the at least one second share, sending, by the at least one second computing device, the message signed with the at least one second share and the at least one first share to a full node of the computer network, and adding a transaction to a ledger of the computer network, in accordance with the received message signed by the at least one first share and the at least one second share. In some embodiments, the message signed by the at least one first share and the at least one second share may correspond to a private cryptographic key of the computer network.

In some embodiments, the distributed key generation MPC protocol may be based on at least one of an elliptic curve digital signature algorithm (ECDSA), Edwards-curve digital signature algorithm (EdDSA) and a Schnorr signature algorithm. In some embodiments, the total number of the at least one first share and the at least one second share may be smaller than or equal to the total number of the at least one first computing device and the at least one second computing device. In some embodiments, the total number of the at least one first share and the at least one second share may be two, and/or the total number of the at least one first computing device and the at least one second computing device may be two.

In some embodiments, the at least one first computing device may include mobile computing device. In some embodiments, the at least one second computing device may be connected to the full node of the computer network. In some embodiments, the distributed key generation MPC protocol may include hierarchical deterministic key generation, and wherein each new generated key is based on a previously generated key. In some embodiments, a key rotation protocol may be applied on the at least one first share and on the at least one second share for each new transaction. In some embodiments, message authentication may be carried out by the at least one first computing device.

In some embodiments, the message signed by the at least one first share and the at least one second share may be validated to correspond to a public cryptographic key of the computer network. In some embodiments, communication may be established with an external server to retrieve authentication data for recovery of at least one of the at least one first computing device and the at least one second computing device.

In some embodiments, the at least one second share at the external server may be stored, and/or the at least one second computing device may be detected as offline, and/or the at least one second share may be sent to the at least one first computing device, and/or the at least one second share may be authenticated by the at least one first computing device. In some embodiments, the at least one first share at the external server may be stored, and/or the at least one first computing device may be detected as offline, and/or the at least one first share may be sent to the at least one second computing device, and/or the at least one first share may be authenticated by the at least one second computing device.

There is thus provided, in accordance with some embodiments of the invention, a system for creation of a multi-party computation (MPC) cryptographic signature for a blockchain based computer network for a message for signing received by at least one first computing device to sign the received message with a generated at least one first share of a cryptographic key, based on a distributed key generation MPC protocol, the system including: at least one second computing device, configured to: generate at least one second share of the cryptographic key, based on the distributed key generation MPC protocol, receive, from the at least one first computing device, the message signed with the at least one first share, and sign with the at least one second share the received message signed with the at least one first share, and a full node of the computer network, in communication with the at least one second computing device, the full node configured to: receive, from the at least one second computing device, the message signed with the at least one second share, and add a transaction to a ledger of the computer network, in accordance with the received message signed by the at least one first share and the at least one second share. In some embodiments, the message signed by the at least one first share and the at least one second share may correspond to a private cryptographic key of the computer network.

In some embodiments, the distributed key generation MPC protocol may be based on at least one of an elliptic curve digital signature algorithm (ECDSA), Edwards-curve digital signature algorithm (EdDSA) and a Schnorr signature algorithm. In some embodiments, the total number of the at least one first share and the at least one second share may be smaller than or equal to the total number of the at least one first computing device and the at least one second computing device. In some embodiments, the total number of the at least one first share and the at least one second share may be two, and/or the total number of the at least one first computing device and the at least one second computing device may be two. In some embodiments, the at least one first computing device may include a mobile computing device.

In some embodiments, the at least one second computing device may be connected to the full node of the computer network. In some embodiments, the distributed key generation MPC protocol may include hierarchical deterministic key generation, and wherein each new generated key is based on a previously generated key. In some embodiments, a key rotation protocol may be applied on the at least one first share and on the at least one second share for each new transaction. In some embodiments, the at least one first computing device may be configured to carry out message authentication.

In some embodiments, the at least one first computing device may be configured to validate that the message signed by the at least one first share and the at least one second share corresponds to a public cryptographic key of the computer network. In some embodiments, the at least one first computing device may be configured to communicate with an external server to retrieve authentication data for recovery of at least one of the at least one first computing device and the at least one second computing device.

In some embodiments, the at least one second share may be stored at the external server, and/or upon detection that the at least one second computing device is offline the external server may send the at least one second share to the at least one second computing device and authenticate the at least one second share by the at least one first computing device. In some embodiments, the at least one first share may be stored at the external server, and/or upon detection that the at least one first computing device is offline the external server may send the at least one first share to the at least one first computing device and authenticate the at least one first share by the at least one second computing device.

BRIEF DESCRIPTION OF THE DRAWINGS

The subject matter regarded as the invention is particularly pointed out and distinctly claimed in the concluding portion of the specification. The invention, however, both as to organization and method of operation, together with objects, features, and advantages thereof, may best be understood by reference to the following detailed description when read with the accompanying drawings in which:

Figure 1:
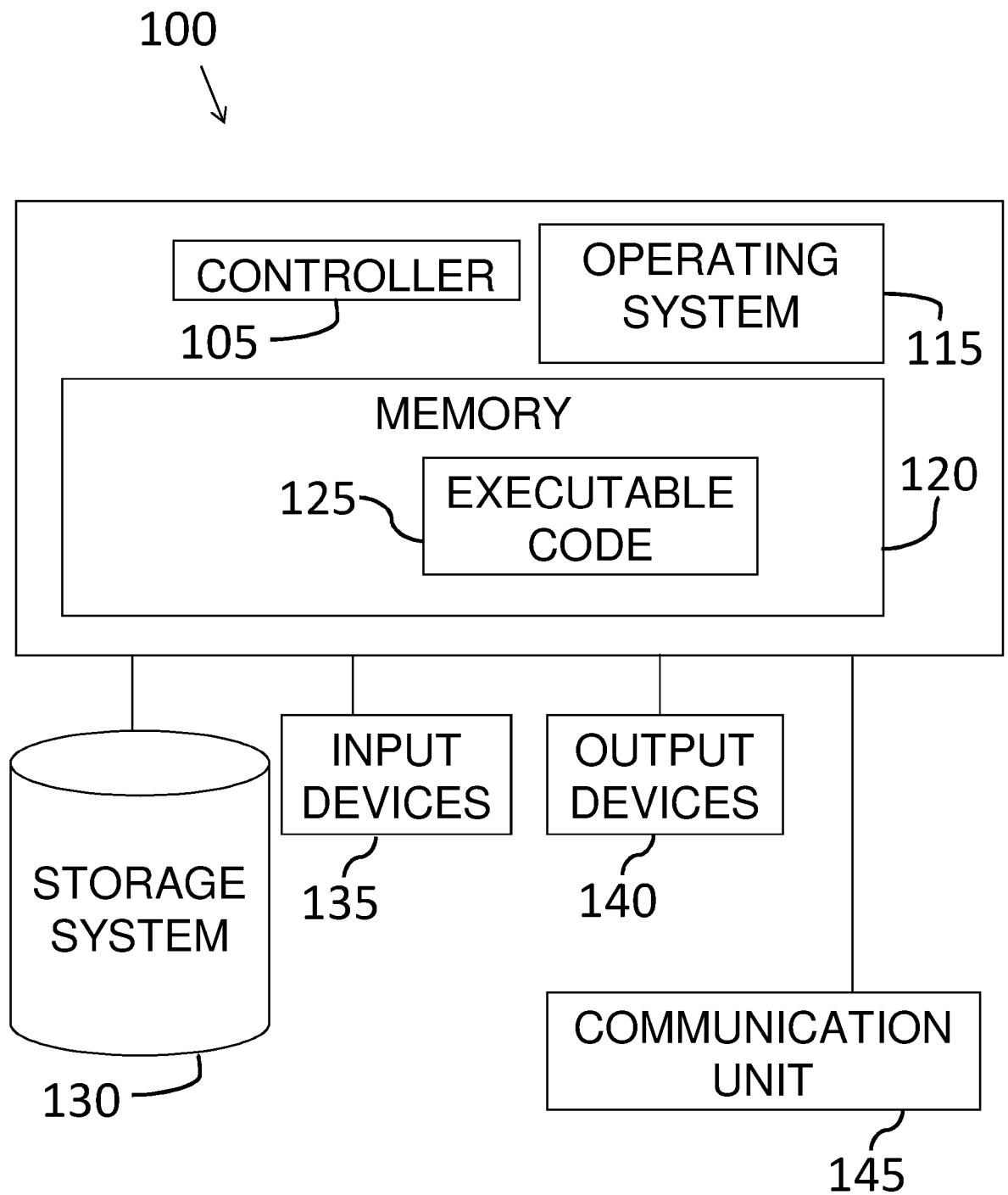
FIG. 1 shows a block diagram of an example computing device, according to some embodiments of the invention.

It will be appreciated that for simplicity and clarity of illustration, elements shown in the figures have not necessarily been drawn to scale. For example, the dimensions of some of the elements may be exaggerated relative to other elements for clarity. Further, where considered appropriate, reference numerals may be repeated among the figures to indicate corresponding or analogous elements.

DETAILED DESCRIPTION OF EMBODIMENTS OF THE INVENTION

In the following detailed description, numerous specific details are set forth in order to provide a thorough understanding of the invention. However, it will be understood by those skilled in the art that the present invention may be practiced without these specific details. In other instances, well-known methods, procedures, and components, modules, units and/or circuits have not been described in detail so as not to obscure the invention. Some features or elements described with respect to one embodiment may be combined with features or elements described with respect to other embodiments. For the sake of clarity, discussion of same or similar features or elements may not be repeated.

Although embodiments of the invention are not limited in this regard, discussions utilizing terms such as, for example, "processing", "computing", "calculating", "determining", "establishing", "analyzing", "checking", or the like, may refer to operation(s) and/or process(es) of a computer, a computing platform, a computing system, or other electronic computing device, that manipulates and/or transforms data represented as physical (e.g., electronic) quantities within the computer's registers and/or memories into other data similarly represented as physical quantities within the computer's registers and/or memories or other information non-transitory storage medium that may store instructions to perform operations and/or processes. Although embodiments of the invention are not limited in this regard, the terms "plurality" and "a plurality" as used herein may include, for example, "multiple" or "two or more". The terms "plurality" or "a plurality" may be used throughout the specification to describe two or more components, devices, elements, units, parameters, or the like. The term set when used herein may include one or more items. Unless explicitly stated, the method embodiments described herein are not constrained to a particular order or sequence. Additionally, some of the described method embodiments or elements thereof can occur or be performed simultaneously, at the same point in time, or concurrently.

Reference is made to FIG. 1, which is a schematic block diagram of an example computing device, according to some embodiments of the invention. Computing device 100 may include a controller or processor 105 (e.g., a central processing unit processor (CPU), a chip or any suitable computing or computational device), an operating system 115, memory 120, executable code 125, storage 130, input devices 135 (e.g. a keyboard or touchscreen), and output devices 140 (e.g., a display), a communication unit 145 (e.g., a cellular transmitter or modem, a Wi-Fi communication unit, or the like) for communicating with remote devices via a communication network, such as, for example, the Internet. Controller 105 may be configured to execute program code to perform operations described herein. The system described herein may include one or more computing device(s) 100, for example, to act as the various devices and/or the components shown in FIGS. 2A-2B. For example, system 200 may be, or may include computing device 100 or components thereof.

Operating system 115 may be or may include any code segment (e.g., one similar to executable code 125 described herein) designed and/or configured to perform tasks involving coordinating, scheduling, arbitrating, supervising, controlling or otherwise managing operation of computing device 100, for example, scheduling execution of software programs or enabling software programs or other modules or units to communicate.

Memory 120 may be or may include, for example, a Random Access Memory (RAM), a read only memory (ROM), a Dynamic RAM (DRAM), a Synchronous DRAM (SD-RAM), a double data rate (DDR) memory chip, a Flash memory, a volatile memory, a non-volatile memory, a cache memory, a buffer, a short term memory unit, a long term memory unit, or other suitable memory units or storage units. Memory 120 may be or may include a plurality of, possibly different memory units. Memory 120 may be a computer or processor non-transitory readable medium, or a computer non-transitory storage medium, e.g., a RAM.

Executable code 125 may be any executable code, e.g., an application, a program, a process, task or script. Executable code 125 may be executed by controller 105 possibly under control of operating system 115. For example, executable code 125 may be a software application that performs methods as further described herein. Although, for the sake of clarity, a single item of executable code 125 is shown in FIG. 1, a system according to embodiments of the invention may include a plurality of executable code segments similar to executable code 125 that may be stored into memory 120 and cause controller 105 to carry out methods described herein.

Storage 130 may be or may include, for example, a hard disk drive, a universal serial bus (USB) device or other suitable removable and/or fixed storage unit. In some embodiments, some of the components shown in FIG. 1 may be omitted. For example, memory 120 may be a non-volatile memory having the storage capacity of storage 130. Accordingly, although shown as a separate component, storage 130 may be embedded or included in memory 120.

Input devices 135 may be or may include a keyboard, a touch screen or pad, one or more sensors or any other or additional suitable input device. Any suitable number of input devices 135 may be operatively connected to computing device 100. Output devices 140 may include one or more displays or monitors and/or any other suitable output devices. Any suitable number of output devices 140 may be operatively connected to computing device 100. Any applicable input/output (I/O) devices may be connected to computing device 100 as shown by blocks 135 and 140. For example, a wired or wireless network interface card (NIC), a universal serial bus (USB) device or external hard drive may be included in input devices 135 and/or output devices 140.

Embodiments of the invention may include an article such as a computer or processor non-transitory readable medium, or a computer or processor non-transitory storage medium, such as for example a memory, a disk drive, or a USB flash memory, encoding, including or storing instructions, e.g., computer-executable instructions, which, when executed by a processor or controller, carry out methods disclosed herein. For example, an article may include a storage medium such as memory 120, computer-executable instructions such as executable code 125 and a controller such as controller 105. Such a non-transitory computer readable medium may be for example a memory, a disk drive, or a USB flash memory, encoding, including or storing instructions, e.g., computer-executable instructions, which when executed by a processor or controller, carry out methods disclosed herein. The storage medium may include, but is not limited to, any type of disk including, semiconductor devices such as read-only memories (ROMs) and/or random access memories (RAMs), flash memories, electrically erasable programmable read-only memories (EEPROMs) or any type of media suitable for storing electronic instructions, including programmable storage devices. For example, in some embodiments, memory 120 is a non-transitory machine-readable medium.

A system according to embodiments of the invention may include components such as, but not limited to, a plurality of central processing units (CPU) or any other suitable multi-purpose or specific processors or controllers (e.g., controllers similar to controller 105), a plurality of input units, a plurality of output units, a plurality of memory units, and a plurality of storage units. A system may additionally include other suitable hardware components and/or software components. In some embodiments, a system may include or may be, for example, a personal computer, a desktop computer, a laptop computer, a workstation, a server computer, a network device, or any other suitable computing device.

Figure 2A:
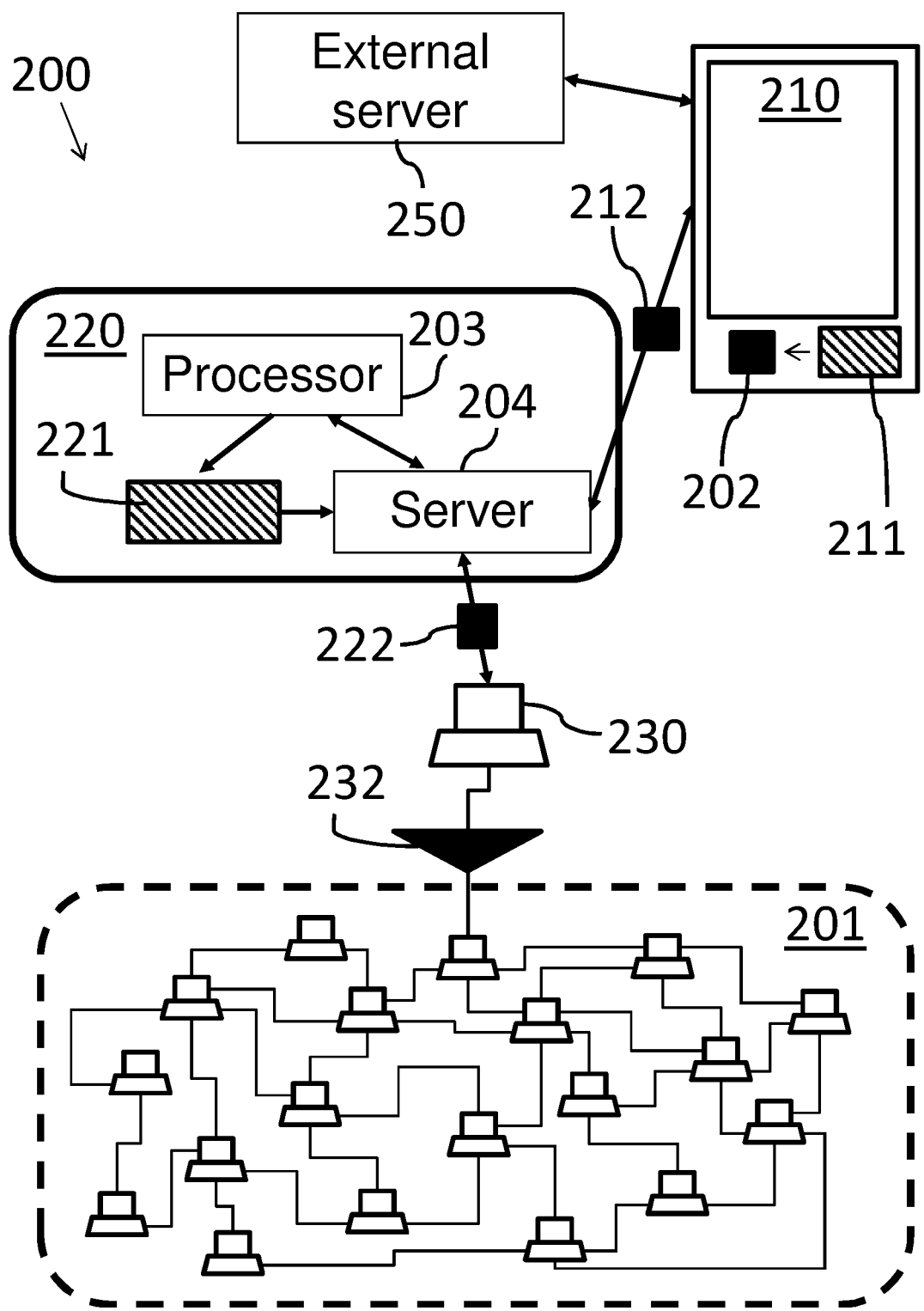
FIGS. 2A-2B show block diagrams of a multi-party computation (MPC) cryptographic signature system for a blockchain based computer network, according to some embodiments of the invention.
Figure 2B:
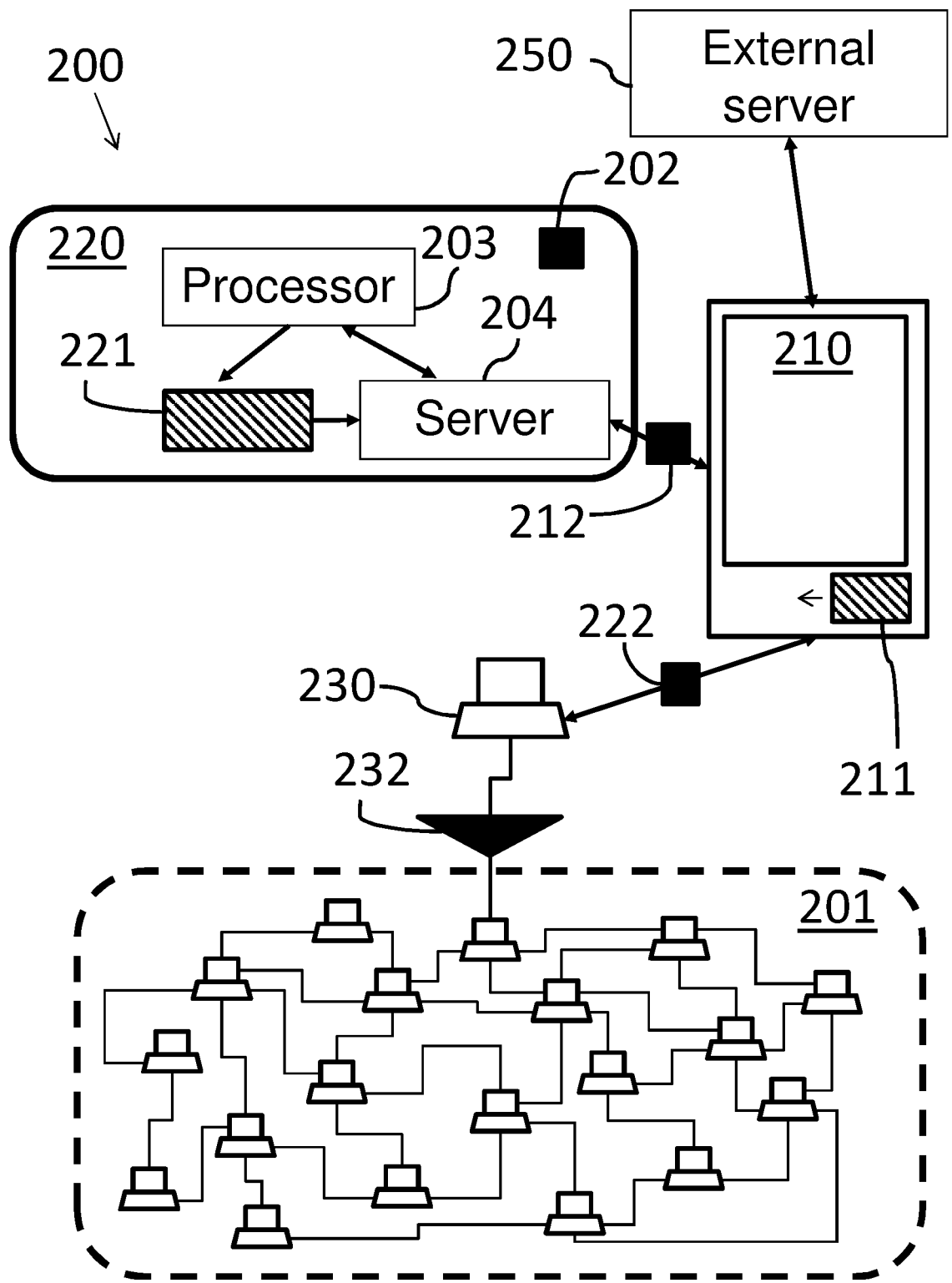

Reference is now made to FIGS. 2A-2B, which show block diagrams of a multi-party computation (MPC) cryptographic signature system 200 for a blockchain based computer network 201, according to some embodiments. In FIGS. 2A-2B, the direction of arrows may indicate the direction of information flow.

System 200 may be configured to securely add a transaction to a ledger of the blockchain based computer network 201 utilizing the MPC protocol to split a cryptographic key, into a plurality of shares, between a plurality of computing devices, such as computing devices 210, 220. System 200 may include at least one first computing device 210 (e.g., a client device), at least one second computing device 220 (e.g., a server device) and a full node 230 of the computer network 201 communicating therebetween.

In some embodiments, the full node 230 may be any computing device that connects to the blockchain based computer network 201 and fully (or substantially fully) verifies all of the blockchain's rules. System 200 may include at least one full node 230 for each supported blockchain network (e.g., one full node for a 'Bitcoin' network and another full node for an 'Ethereum' network). Multiple full nodes for a single blockchain network may be included for redundancy and load balancing. In some embodiments, full node 230 may be directly connected to the at least one second computing device 220.

It should be noted that while a single first computing device 210 and a single second computing device 220 are illustrated in FIGS. 2A-2B, any number of computing devices may similarly apply and therefore hereinafter a plurality of computing devices is described. In some embodiments, the number of shares may correspond to the number of computing devices in system 200, such that for example if the processor 203 and server 204 are separated to different computing devices the total number of shares may then become three and the messages signed by the first share 221 and second share 222 may then be signed by a third share.

In some embodiments, the plurality of shares may include at least one first share and at least one second share, and the sum or total number of the at least one first share and the at least one second share may be smaller than or equal to the sum or total number of the at least one first computing device and the at least one second computing device, for example the sum of the at least one first share and the at least one second share may be exactly two shares.

According to some embodiments, the at least one first computing device 210 may receive a message 202 for signing. For instance, a user desiring to carry out a transaction on the blockchain based computer network 201 (e.g., transfer cryptocurrency to a particular account) may use the at least one first computing device 210 (e.g., a smartphone, tablet, etc.) to generate a message for signing that corresponds to the desired transaction, where the signing protocol provides a secure way to complete the transaction.

The at least one first computing device 210 may generate (e.g., by a processor 105 of a computing device 100 shown in FIG. 1) at least one first share 211 of a cryptographic key, based on a distributed key generation MPC protocol, while other shares of the cryptographic key may be generated by other computing devices of system 200. Thus, the at least one second computing device 220 may generate (e.g., by a processor 105 of computing device 100 shown in FIG. 1) at least one second share 221 of the cryptographic key, based on the distributed key generation MPC protocol. Since the key generation protocol is a distributed key generation MPC protocol, the generated at least one first share 211 remains at the at least one first computing device 210, and similarly the generated at least one second share 221 remains at the at least one second computing device 220, such that these shares of the cryptographic key are only utilized for signing messages and are not transferred within the system 200. The at least one first computing device may include a mobile computing device, for example a smartphone, tablet, etc.

In some embodiments, the key generation may simultaneously occur once at initialization of system 200, for instance with a new user having a client device (e.g., a smartphone) or first computing device 210 added to system 200 (e.g., via a dedicated algorithm for a mobile device), thus setting the "secret" of the key operation (e.g., the combination of the private key and the public key) or signing on all parties of system 200.

It should be noted that the at least one first share 211 and the at least one second share 221 are generated separately, wherein both the at least one first share 211 and the at least one second share 221 are required in order to sign a transaction at the blockchain based computer network 201.

In order to complete a blockchain based transaction with the computer network 201, the at least one first share 211 as well as the at least one second share 221 may be required in order to sign a message, by the computing devices, (e.g., a message associated with a transaction) with their combination that may correspond to an equivalent private cryptographic key of the computer network (e.g., correspond to a private key in a 'Bitcoin' blockchain network). Thus, in case of a malicious cyber-attack where either one of the at least one first computing device 210 or the at least one second computing device 220 is compromised, the corresponding private cryptographic key of the blockchain based computer network 201 (that corresponds to the combination of the first and second shares) cannot be extracted and therefore data within the computer network 201 maintains its integrity.

According to some embodiments, the at least one first computing device 210 may sign the received message 202 with the at least one first share 211. The at least one first computing device 210 may send the message 212 signed with the at least one first share 211 to the at least one second computing device 220 (e.g., via a dedicated communication unit 145 shown in FIG. 1). In some embodiments, the at least one second computing device 220 may include at least one processor 203 and at least one server 204, such that the processor 203 and/or the server 204 may generate shares of the cryptographic key and/or sign messages accordingly. The at least one first computing device 210 may additionally carry out message authentication on the received message 202, for instance validating the received message 202 with a predefined message template.

The at least one second computing device 220 may sign the message 212 signed with the at least one first share 211 with the at least one second share 221. The at least one second computing device 220 may send the message 222 signed with the at least one first share 211 and the at least one second share 221 to full node 230 of the computer network 201 to securely complete the transaction. Thus, a universal cryptocurrency wallet may be created in a client-server architecture, including low performance client devices (e.g., restricted by battery, CPU, memory, communication, etc.). Such wallet users may enjoy all the benefits and comfort of a server-based solution without compromising their security due to the utilization of the distributed MPC protocol. In some embodiments, the key management in system 200 may be controlled by the at least one second computing device 220, such that there is no need for a third party to manage the keys in the network thereby reducing potential threats to the system.

The full node 230 may add a transaction 232 to a ledger of the computer network 201, in accordance with the received message 222 that was signed by the at least one first share 211 and the at least one second share 221. At the computer network 201, the added transaction 232 may be received as a regular transaction, without any "multi-signature" scripts or smart contracts, so that the added security layer is not visible to other users of the computer network 201. In some embodiments, the full node 230 may apply the MPC protocol to compare the received signed message 222 to the predefined public cryptographic key of the computer network 201 and upon a match the transaction 232 may be added to the ledger of the computer network 201.

It should be noted that the same MPC based splitting, as described for the above method and system, may be applied to various blockchain networks, including those that do not support "multi-signature" protocols at all since the computer network 201 receives the new transaction as a regular transaction instead of a "multi-signature" transaction. Thus, using the same core technology may significantly reduce the risk associated with separately developing a specific solution for each blockchain network.

According to some embodiments, the splitting of the signature responsibility between at least two computing devices, for instance a client's first computer device 210 and a service provider's second computing device 220, may eliminate the single point of failure confidentiality problems associated with the atomic private key. However, it may also introduce multiple point of failure to the key availability. In case either computing device becomes unavailable a recovery process may take place, as further detailed below.

In some embodiments, the at least one first computing device 210 may communicate with an external server 250 to retrieve authentication data for recovery of at least one of the at least one first computing device 210 and the at least one second computing device 220. The at least one second share 221 may be stored at the external server, and wherein upon detection that the at least one second computing device 220 is offline the external server 250 may send the at least one second share 221 to the at least one second computing device 220 and authenticate the at least one second share 221 by the at least one first computing device 210. Similarly, the at least one first share 211 may be stored at the external server 250, and wherein upon detection that the at least one first computing device 210 is offline the external server 250 may send the at least one first share 211 to the at least one first computing device 210 and authenticate the at least one first share 211 by the at least one second computing device 220.

Referring now to FIG. 2B, system 200 is illustrated where the message 202 is initially received by the at least one second computing device 220 for signing. In some embodiments, the at least one first computing device 210 may be a user's device (e.g., PC, smartphone, etc.) and the at least one second computing device 220 may be a service provider's device (e.g., a server machine) such that the sequence of message signing and or adding transactions to the blockchain network may be interchanged according to which computing device 210, 220 receives the message for signing 202. For example, once the at least one first share 211 and the at least one second share 221 are generated, either device of the at least one first computing device 210 and the at least one second computing device 220 may receive the message for signing 202.

The at least one second computing device 220 may sign the received message 202 with the at least one second share 221 and send the signed message 212 to the at least one first computing device 210 for signing with the at least one second share 211. The at least one first computing device 210 may send the message 222 signed with the at least one second share 221 and the at least one first share 211 to the full node 230 to add the transaction to the computer network 201. It should be noted that since the role of the at least one first computing device 210 and the at least one second computing device 220 is interchangeable, each one of the user's device (e.g., PC, smartphone, etc.) or the service provider's device (e.g., a server machine) may be indicated as the first/second computing device 210, 220 while maintaining the proper process and elements of system 200.

In some embodiments, the at least one second computing device 220 may indicate a computing device having more computing resources to carry out the majority of computations (e.g., the service provider's server computing device), such that any user of a basic computing device (e.g., a smartphone as the first computing device 210) may participate in the system 200 since the computations requiring significant computing resources may be carried out on a different machine.

In some embodiments, the distributed key generation MPC protocol may be based on at least one of an elliptic curve digital signature algorithm (ECDSA), Edwards-curve digital signature algorithm (EdDSA) and a Schnorr signature algorithm. It should be appreciated that other MPC protocols may be used.

For example, an elliptic curve digital signature algorithm (ECDSA) signature scheme is described: assuming that Alice has a private key 'x', the corresponding public key is 'x·G' and she wants to sign a message 'm'. Alice may compute a signature on the message 'm' as follows:
1. Choose ephemeral key 'k'.
2. Compute R=k·G
3. Assume 'R' is the point (rx,ry).
4. Set 'r' to be the 'x' coordinate of the curve-point 'R'.
5. Compute the signature: s=k−1·(H(m)+r·x), where 'H' denotes a hash function (for instance, using SHA256).
6. Output (r,s).

According to some embodiments, system 200 may operate with any type of blockchain based computer network 201 without the need for creation of separate and/or dedicated "secrets" (e.g., dedicated operation of key pairs) for each blockchain network, due to utilization of a hierarchical deterministic (HD) property, applied to the MPC protocol. In some embodiments, the HD property may be combined with a rotation property that allows the solution to change the different shares while maintaining the same equivalent private/public key pair.

For example, Bitcoin's "BIP32" protocol defines a method for child key derivation from a parent key. This method may be extended using indices and tree structures to create an "infinite number" of public/private key pairs from one master key. Using an agreed hierarchical system, as specified in the "BIP44" protocol may enable the creation of HD set of elliptic curve key pairs, for the ECDSA protocol. The HD property may be used for a variety of use cases, such as generating addresses and/or assigning one master key for many cryptocurrencies. In system 200, the key generation algorithm may be used to apply the HD concept to the MPC setting, such that the first/second computing device 210, 220 may hold a share of the secret key and the other first/second computing device 210, 220 may hold the other share for combined signing (without revealing each other share of the secret key), assuming that both parties know the encryption public parameters.

Whenever needed (e.g., for a new address for transaction, or a new type of cryptocurrency), each of the parties at system 200 may independently (and/or non-interactively) derive its next key based on previous keys to create a common chain code (cc), by advancing the index variable and performing the following algorithm (to be calculated by both computing devices):

1. $I = hmac-sha512(key = cc, data = Q\|index)$
2. $I = I_L\|I_R$ where $|I_L| = |I_R| = 32$ bytes
3. $K_C = I_R I_L \cdot Q_2$
4. $K_S = I_R^{-1} \cdot Q_1$
5. $Q_{child} = I_L \cdot Q$
6. $C_{key,new} = C_{key}^{Enc(I_R^{-1})}$
7. $cc_{new} = I_R$ Where 'C'-private key share is $k_c = I_R I_L \cdot x_2$, the 'S'-private key share is $k_S = I_R^{-1} \cdot x_1$, 'hmac' is a hash based message authentication code, and where the two parties create a joint signature for message string of zeros and verify it alone.

According to some embodiments, the known "key rotation" method may be applied with a dedicated algorithm to support the unique MPC protocol for key sharing between the first computing device 210 and the second computing device 210. Key rotation is a method that keeps the private key the same and also keeps the public key the same, while changing the private key shares. Thus, security of the system may be increased since the time window for the attacker to get both keys is significantly reduced. Using the key rotation method, attackers must get both key shares before any key-rotate operation while the key shares are unchanged. When the key rotation method is applied, if the attackers have one share before a rotation and the other after a rotation they will not be able to recover the private key.

It should be noted that since both HD-tree and key-rotation protocols are multiplicative, the property of commutativity modulo on the field order between them may be derived with a rotation function: Rot(HD(MK))=HD(Rot(MK)), where MK is the master key. Thus, the application for a wallet service may be that the client (e.g., user of the first computing device 210) needs only keep in static memory the master key, where the master key may be the only rotating element in the system. The master key may facilitate rotation for the entire HD-tree client shares without changing the HD-tree public addresses, thus keeping the keys unchanged. New addresses may be generated, and they will stay consistent after master key rotation (e.g., due to the unchanged keys).

In some embodiments, system 200 may allow recovery of the at least one first computing device 210 through know your customer (KYC) authentication. The customer (or user of the at least one first computing device 210) may create authentication data on the server side, for instance using a third-party KYC service such that the customer may validate its identity. The service provider (or user of the at least one second computing device 220) may receive verified real world details (e.g., name, date of birth, address, face recognition data, etc.) of the consumer. In some embodiments, the customer may generate a key pair with a randomized passphrase to protect the private key and send a certificate signing request (CSR) to server 204 to create a transport layer security (TLS) certificate. The server may send the TLS certificate to the customer, and the client may send the certificate with an encrypted private key to the server for the server to store. For simplicity, the client may store the passphrase (which may serve as a recovery secret) in plaintext, for instance on cloud storage, and then if the passphrase is forgotten or lost, recovery may be possible. In case that the client has lost its device and wants to recover its account, the client may provide a username, and the server may present alternative authentication option, such as, for example: KYC, single sign on (SSO), and the like, and the client may recover the passphrase, for instance from cloud storage.

The client may authenticate (using, for example, the first computing device 210) its identity to the server with the relevant authentication method: for instance providing KYC details again through a third-party service. If authentication is successful, and the KYC details are verified and matching the details established on the on-boarding phase then the server may send to the client relevant client key share (e.g., with an encrypted version) and the certificate with encrypted private key such that the client may decrypt the encrypted private key and regenerate its key pair. Using the decrypted private key, the client may decrypt the encrypted client share and may finally regain control of its blockchain assets.

In some embodiments, the client (e.g., user of the first computing device 210) may be provided with an encrypted version of the server's share of the cryptographic key (e.g., the at least one second share 221), which corresponds to the client's share (e.g., the at least one first share 211), where the server's share may be encrypted with a public key. The client may thus be able to verify that indeed the encrypted server share is matching its share, using the "public share verifiability" property. The server's recovery private key may be saved by an external recovery party (e.g., by an external server), and when the recovery party determined that the server, for instance the at least one second computing device 220, is unavailable, it may release the server's recovery private key.

In some embodiments, the server recovery key pair may be generated on an offline computer, where the secret may be split using secret sharing scheme (e.g., Shamir secret sharing, SSS). The parts of the secret (e.g., shares of the cryptographic key) may be then transferred, for instance via flash drive, to the centralized entities for storing at a cold storage (e.g., a safe).

In some embodiments, users of system 200 may use the server recovery private key, decrypt the server's recovery share and recreate their private keys to export them as Hexadecimal strings or mnemonics code that may be imported into other algorithms, thereby creating full recovery and universality properties for blockchain networks.

In case that the server recovery key pair is created offline, the server recovery public key may be sent to the at least one second computing device 220 and may be publicly posted while the server recovery private key may be securely transferred to the recovery party. In some embodiments, on the initial key generation event, and every event where the shares change (e.g., rotation), the server may encrypt its share with the server recovery public key, with the encrypted share sent to the client. The client may receive the encrypted server share and verify that it matches its own client share using the "public server recovery public key "verifiability" property to store the encrypted share on the same storage as the client share.

In some embodiments, the client's device (e.g., the at least one first computing device 210) may include code that can locally restore the private key that the two shares represent, given the server share, such that when server recovery is required, the recovery party may release the private key corresponding to the server's share. The client may then download the private key from the corresponding URL address and decrypt the encrypted server recovery share. Finally, the client's device (e.g., the at least one first computing device 210) may restore the private key associated with the account and export it as Hexadecimal representation so the users of the system 200 may import it to dedicated cryptocurrency wallets and/or other algorithms of their choice.

Figure 3A:
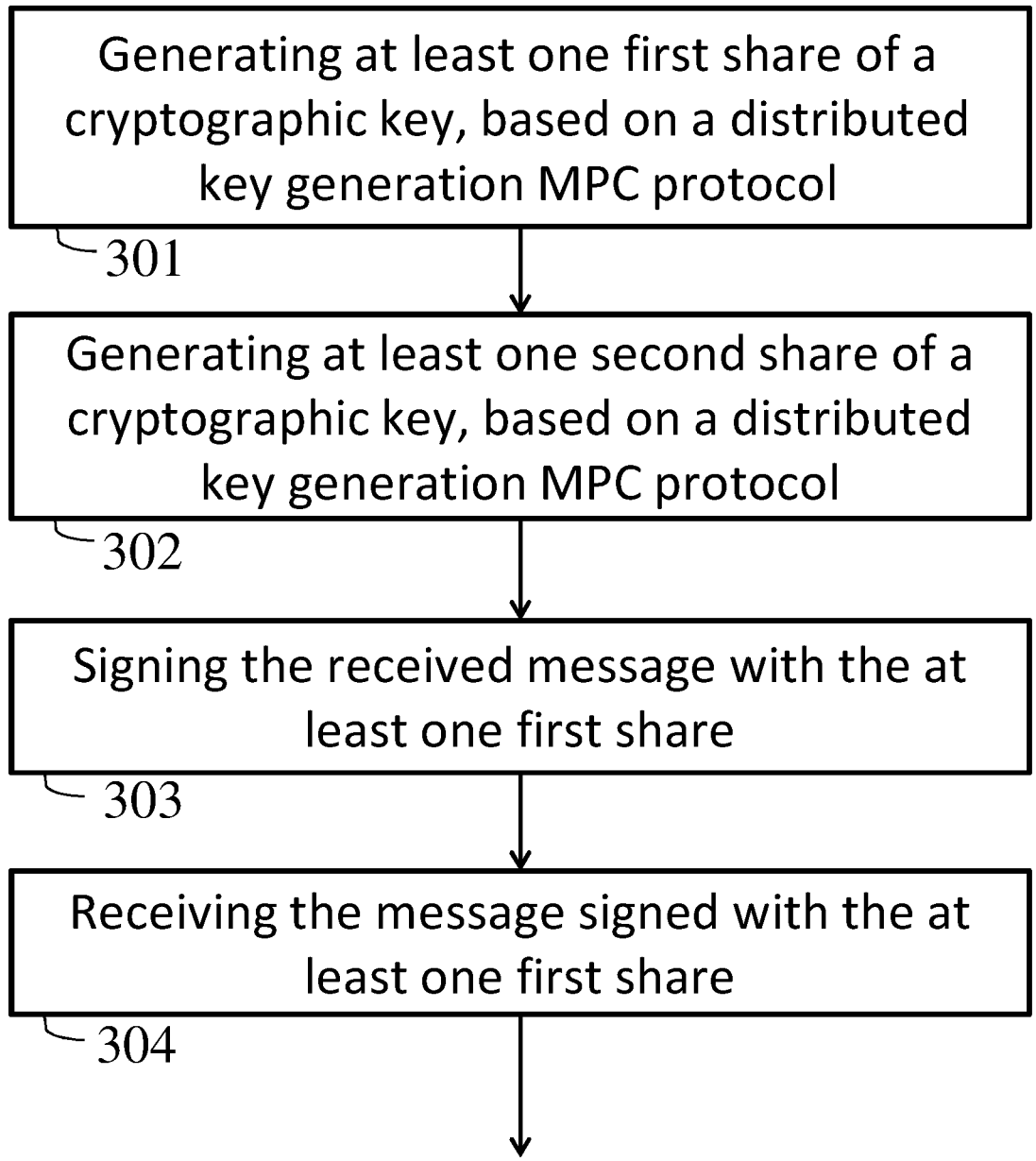
FIGS. 3A-3B show a flowchart for a method of creating a multi-party computation (MPC) cryptographic signature for a blockchain based computer network, for a received message for signing, according to some embodiments of the invention.
Figure 3B:
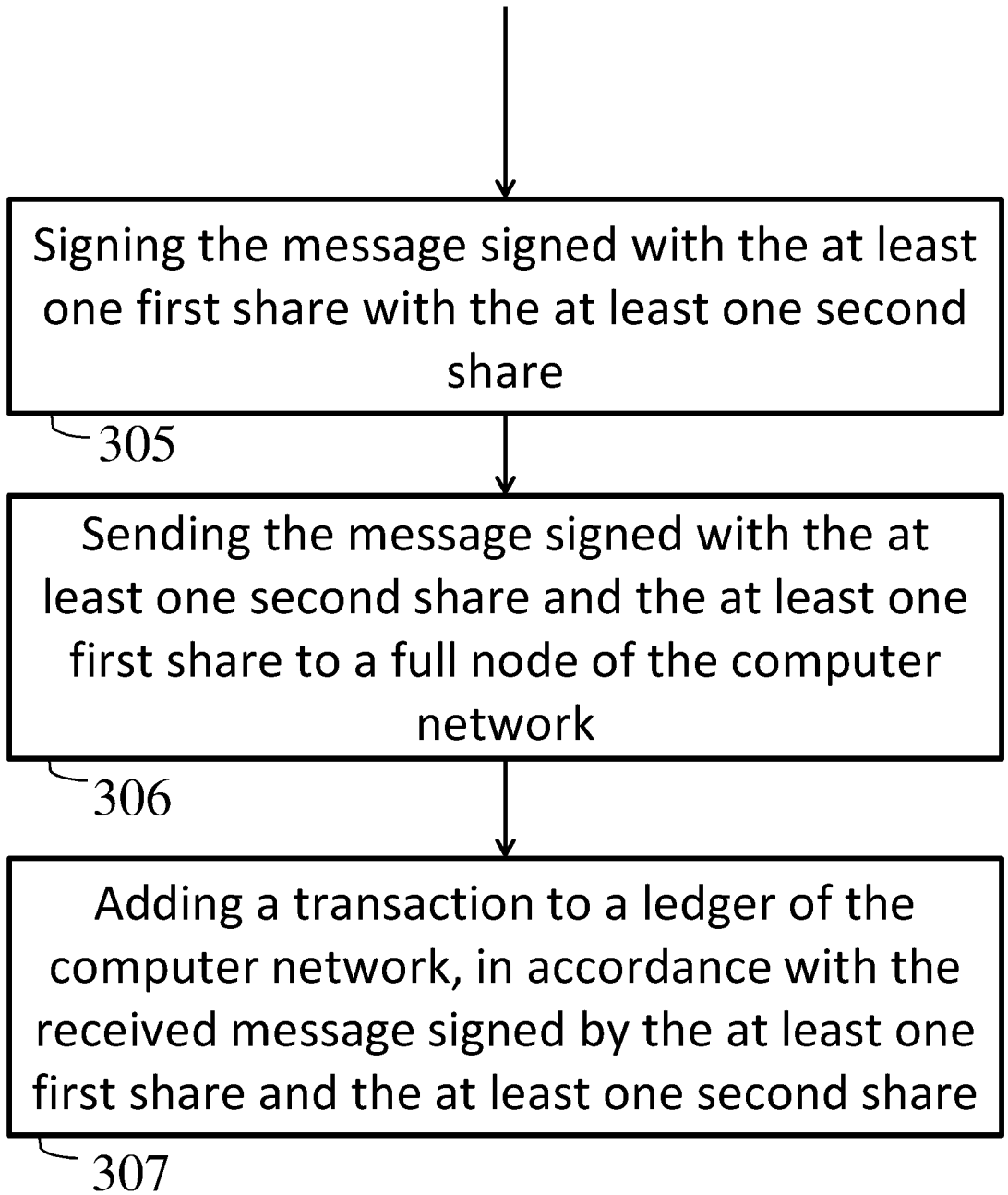

Reference is now made to FIGS. 3A-3B, which show a flowchart of a method of creating a multi-party computation (MPC) cryptographic signature for a blockchain based computer network 201, according to some embodiments. The at least one first computing device 210 may generate 301 at least one first share 211 of the cryptographic key, based on a distributed key generation MPC protocol. Similarly, the at least one second computing device 220 may generate 302 at least one second share 221 of the cryptographic key, based on the distributed key generation MPC protocol.

In some embodiments, the at least one first computing device 210 may sign 303 the received message 202 with the at least one first share 211, and the at least one second computing device 220 may receive 304 the message 212 signed with the at least one first share 211. The at least one second computing device 220 may sign 305 the message 212 signed with the at least one first share 211 with the at least one second share 221 and send 306 the message 222 signed with the at least one second share 221 and the at least one first share 211 to the full node 230 of the computer network 201. In some embodiments, the full node 230 may add 307 a transaction to a ledger of the computer network 201, in accordance with the received message 222 signed by the at least one first share 211 and the at least one second share 221, wherein the message 222 signed by the at least one first share 211 and the at least one second share 221 may correspond to an equivalent private cryptographic key of the computer network 201.

While certain features of the invention have been illustrated and described herein, many modifications, substitutions, changes, and equivalents may occur to those skilled in the art. It is, therefore, to be understood that the appended claims are intended to cover all such modifications and changes as fall within the true spirit of the invention.

Various embodiments have been presented. Each of these embodiments may of course include features from other embodiments presented, and embodiments not specifically described may include various features described herein.

The invention claimed is:

1. A method of creating a multi-party computation (MPC) cryptographic signature for a blockchain based computer network, for signing a received message, the method comprising:
generating, by at least one first computing device, at least one first share of a cryptographic key, based on a distributed key generation MPC protocol;
generating, by at least one second computing device, at least one second share of the cryptographic key, based on the distributed key generation MPC protocol;
signing, by the at least one first computing device, the received message with the at least one first share;
receiving, by the at least one second computing device, the message signed with the at least one first share;
signing, by the at least one second computing device, the message signed with the at least one first share with the at least one second share;
sending, by the at least one second computing device, the message signed with the at least one second share and the at least one first share to a full node of the computer network;
validating that the message signed by the at least one first share and the at least one second share corresponds to a public cryptographic key of the computer network; and
adding a transaction to a ledger of the computer network, in accordance with the received message signed by the at least one first share and the at least one second share, wherein the message signed by the at least one first share and the at least one second share corresponds to a private cryptographic key of the computer network.

2. The method of claim 1, wherein the distributed key generation MPC protocol is based on at least one of an elliptic curve digital signature algorithm (ECDSA), Edwards-curve digital signature algorithm (EdDSA) and a Schnorr signature algorithm.

3. The method of claim 1, wherein the total number of the at least one first share and the at least one second share is smaller than or equal to the total number of the at least one first computing device and the at least one second computing device.

4. The method of claim 3, wherein the total number of the at least one first share and the at least one second share is two, and wherein the total number of the at least one first computing device and the at least one second computing device is two.

5. The method of claim 1, further comprising connecting the at least one second computing device to the full node of the computer network.

6. The method of claim 1, wherein the distributed key generation MPC protocol comprises hierarchical deterministic key generation, and wherein each new generated key is based on a previously generated key.

7. The method of claim 1, further comprising applying a key rotation protocol on the at least one first share and on the at least one second share for each new transaction.

8. The method of claim 1, further comprising carrying out message authentication by the at least one first computing device.

9. The method of claim 1, further comprising communicating with an external server to retrieve authentication data for recovery for at least one of the at least one first computing device and the at least one second computing device.

10. The method of claim 9, further comprising:
storing the at least one second share at the external server;
detecting that the at least one second computing device is offline;
sending the at least one second share to the at least one first computing device; and
authenticating the at least one second share by the at least one first computing device.

11. The method of claim 9, further comprising:
storing the at least one first share at the external server;
detecting that the at least one first computing device is offline;
sending the at least one first share to the at least one second computing device; and
authenticating the at least one first share by the at least one second computing device.

12. A system for creation of a multi-party computation (MPC) cryptographic signature for a blockchain based computer network for a message for signing received by at least one first computing device to sign the received message with a generated at least one first share of a cryptographic key, based on a distributed key generation MPC protocol, the system comprising:
at least one second computing device, configured to:

generate at least one second share of the cryptographic key, based on the distributed key generation MPC protocol;

receive, from the at least one first computing device, the message signed with the at least one first share; and sign with the at least one second share the received message signed with the at least one first share, and a full node of the computer network, in communication with the at least one second computing device, the full node configured to:

receive, from the at least one second computing device, the message signed with the at least one second share; and add a transaction to a ledger of the computer network, in accordance with the received message signed by the at least one first share and the at least one second share, wherein the message signed by the at least one first share and the at least one second share corresponds to a private cryptographic key of the computer network, and wherein the at least one first computing device is further configured to validate that the message signed by the at least one first share and the at least one second share corresponds to a public cryptographic key of the computer network.

13. The system of claim 12, wherein the at least one second computing device is connected to the full node of the computer network.

14. The system of claim 12, wherein the distributed key generation MPC protocol comprises hierarchical deterministic key generation, and wherein each new generated key is based on a previously generated key.

15. The system of claim 12, wherein a key rotation protocol is applied on the at least one first share and on the at least one second share for each new transaction.

16. The system of claim 12, wherein the at least one first computing device is further configured to communicate with an external server to retrieve authentication data for recovery for at least one of the at least one first computing device and the at least one second computing device.

17. The system of claim 16, wherein the at least one second share is stored at the external server, and wherein upon detection that the at least one second computing device is offline the external server is to send the at least one second share to the at least one second computing device and authenticate the at least one second share by the at least one first computing device.

18. The system of claim 16, wherein the at least one first share is stored at the external server, and wherein upon detection that the at least one first computing device is offline the external server is to send the at least one first share to the at least one first computing device and authenticate the at least one first share by the at least one second computing device.

* * * * *